(12) United States Patent
Malek et al.

(10) Patent No.: US 9,191,475 B2
(45) Date of Patent: Nov. 17, 2015

(54) SWITCHES AND SWITCH MOUNTING STRUCTURES

(71) Applicant: Apple Inc., Cupertino, CA (US)

(72) Inventors: Shayan Malek, San Jose, CA (US);
Sawyer I. Cohen, Sunnyvale, CA (US);
Michael B. Wittenberg, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 243 days.

(21) Appl. No.: 13/759,729

(22) Filed: Feb. 5, 2013

(65) Prior Publication Data

US 2014/0216903 A1    Aug. 7, 2014

(51) Int. Cl.
| H01H 9/00 | (2006.01) |
| H04M 1/23 | (2006.01) |
| H01H 15/24 | (2006.01) |

(52) U.S. Cl.
CPC .............. *H04M 1/236* (2013.01); *H01H 15/24* (2013.01); *H01H 2207/004* (2013.01); *H01H 2221/014* (2013.01); *H01H 2223/014* (2013.01); *H01H 2231/022* (2013.01); *Y10T 29/49124* (2015.01)

(58) Field of Classification Search
CPC .................................. H01H 9/02; H05K 13/00
USPC ................. 200/293, 294, 295, 296, 297, 298; 439/67, 77, 492
See application file for complete search history.

(56) References Cited

U.S. PATENT DOCUMENTS

| 4,271,333 | A | * | 6/1981 | Adams et al. .................. 379/368 |
| 4,580,018 | A | * | 4/1986 | Yoshihara ..................... 200/5 A |
| 5,746,307 | A | * | 5/1998 | Joss et al. ...................... 200/303 |
| 6,118,666 | A | * | 9/2000 | Aoki et al. .................... 361/749 |
| 6,169,256 | B1 | * | 1/2001 | Hanahara et al. ............. 200/5 A |
| 6,784,384 | B2 | * | 8/2004 | Park et al. .................... 200/11 R |
| 6,812,898 | B2 | | 11/2004 | Doub et al. |
| 7,164,091 | B2 | | 1/2007 | Lu |
| 7,414,212 | B2 | * | 8/2008 | Huang .......................... 200/334 |
| 7,576,291 | B2 | * | 8/2009 | Tseng et al. .................. 200/296 |
| 8,085,529 | B2 | * | 12/2011 | Zhang ...................... 361/679.01 |
| 8,221,134 | B2 | * | 7/2012 | Dove .............................. 439/67 |
| 8,410,385 | B2 | * | 4/2013 | Dai ............................... 200/344 |
| 8,598,479 | B2 | * | 12/2013 | Quan et al. .................... 200/293 |
| 8,604,372 | B2 | * | 12/2013 | Yang et al. .................... 200/341 |
| 8,624,139 | B2 | * | 1/2014 | Huang .......................... 200/296 |
| 2002/0064031 | A1 | * | 5/2002 | Serizawa et al. .............. 361/749 |
| 2004/0058565 | A1 | * | 3/2004 | Norland et al. ................. 439/67 |
| 2008/0026699 | A1 | * | 1/2008 | Smith ........................... 455/90.2 |
| 2009/0088007 | A1 | * | 4/2009 | Tsai ................................ 439/67 |
| 2009/0301852 | A1 | | 12/2009 | Keist et al. |
| 2011/0228493 | A1 | * | 9/2011 | Liang et al. .................. 361/752 |

* cited by examiner

*Primary Examiner* — Kyung Lee
(74) *Attorney, Agent, or Firm* — Treyz Law Group; G. Victor Treyz; Joseph F. Guihan

(57) ABSTRACT

An electronic device has circuitry mounted within an electronic device housing. The electronic device housing may have housing walls such as metal sidewalls. Openings are formed in an electronic device housing wall to accommodate buttons. A button may have a switch with a switch housing mounted to the housing wall. A movable button member that extends from the switch housing may protrude through a housing opening. Switch terminals are coupled to signal lines on structures such as flexible printed circuits. The switch terminals may be formed from portions of elongated switch leads supported by support structure that are mounted to the housing wall or may be formed on an inner surface of the switch housing. Support structures may be molded into engagement with features on a housing wall or may be mounted to a housing wall using a fastener such as a screw.

24 Claims, 12 Drawing Sheets

SWITCHES AND SWITCH MOUNTING STRUCTURES

BACKGROUND

This relates generally to electronic devices and, more particularly, to switches mounted within electronic device housings.

Electronic devices include electrical components such as buttons. Buttons contain electrical switches. Metal traces on printed circuits are sometimes used to form electrical connections with the electrical switches. For example, an electrical switch in a button such as a cellular telephone ringer button may be coupled to control circuits using traces on a flexible printed circuit. To couple the metal traces to the electrical switch, the flexible printed circuit may be placed between the electrical switch and a housing sidewall. To route the flexible printed circuit to the control circuits, the flexible printed circuit is bent.

The bend in the flexible printed circuit may be characterized by a bend radius. If the bend radius is too large, space may be wasted. If the bend radius is too small, the traces on the flexible printed circuit may fail due to cracking.

It would therefore be desirable to be able to provide electronic devices with improved arrangements for mounting electronic switches for buttons.

SUMMARY

An electronic device has circuitry mounted within an electronic device housing. The electronic device housing may have housing walls such as metal sidewalls. Openings may be formed in the electronic device housing walls to accommodate buttons.

A button may have a switch with a switch housing. A switch mechanism within the switch housing may be controlled with a movable button member. The switch housing may be mounted so that an outer switch housing surface is adjacent to an inner surface of an electronic device housing wall and so that an opposing inner switch housing surface faces interior portions of the electronic device.

When the switch is mounted to the electronic device housing wall, the movable button member protrudes through an opening in the electronic device housing wall. The switch mechanism within the switch housing is coupled to switch terminals using signal paths. The switch terminals are coupled to signal lines on structures such as flexible printed circuits. The flexible printed circuit may route switch signals to control circuitry within the electronic device.

The switch terminals may be formed from portions of elongated switch leads. The switch terminals may be formed on the inner surface of the switch housing or may be supported by support structures that are located adjacent to the switch housing. The support structures may be mounted to an electronic device housing wall. Support structures may be molded over protruding structures or other engagement features on an electronic device housing wall or may be mounted to a housing wall using a fastener such as a screw.

Further features, their nature and various advantages will be more apparent from the accompanying drawings and the following detailed description of the preferred embodiments.

DETAILED DESCRIPTION

Figure 1:
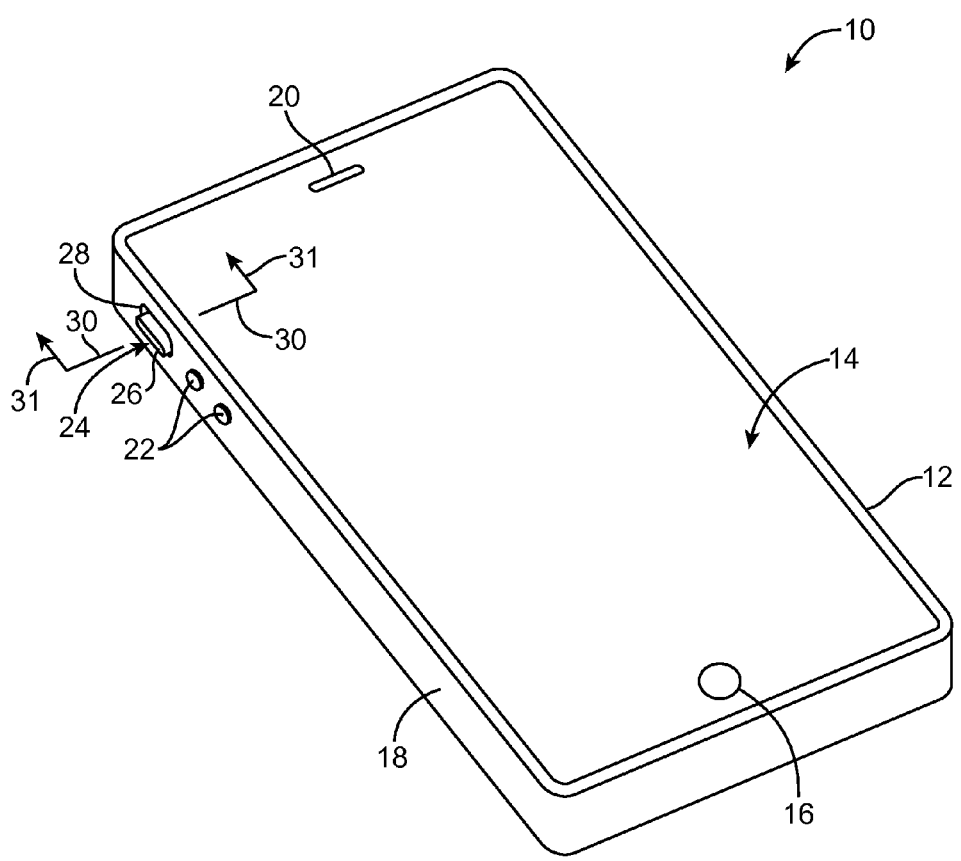
FIG. 1 is a perspective view of an illustrative electronic device of the type that may be provided with switch mounting structures in accordance with an embodiment.

An illustrative electronic device that may be provided with buttons and other electrical components and that may be provided structures for use in mounting buttons and other electrical components is shown in FIG. 1. Electronic devices such as electronic device 10 of FIG. 1 may be cellular telephones, media players, other handheld portable devices, somewhat smaller portable devices such as wrist-watch devices, pendant devices, or other wearable or miniature devices, gaming equipment, tablet computers, notebook computers, desktop computers, televisions, computer monitors, computers integrated into computer displays, or other electronic equipment.

In the example of FIG. 1, device 10 includes a display such as display 14. Display 14 has been mounted in a housing such as housing 12. Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels and thereby adjust display brightness. Display 14 may also include organic light-emitting diode pixels or other pixels with adjustable intensities. In this type of display, display brightness can be adjusted by adjusting the intensities of drive signals used to control individual display pixels.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 20.

Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Device 10 may have planar front and rear surfaces surrounded by peripheral housing structures such as sidewall structures 18 of FIG. 1. Device 10 may, for example, have a planar rear housing wall formed from a sheet of plastic, glass, metal, fiber-based composite, or other materials. Walls 18 may be formed from a band of metal that runs around the periphery of housing 12. For example, walls 18 may be formed from a band of metal with one or more gaps along its length. Walls 18 may also be formed from integral extending portions of a rear housing wall (e.g., curved or vertical metal or plastic sidewalls that extend smoothly upwards from a planar rear housing wall), may be formed from glass, ceramic, or other materials, or may be formed from other suitable structures. Illustrative configurations for housing 12 in which sidewall structures 18 are formed from metal structures such as peripheral metal structures that run around the rectangular periphery of device 10 are sometimes described herein as an example.

As shown in FIG. 1, housing sidewall structures 18 may have openings to accommodate buttons such as buttons 22 and 24. Buttons 22 may be circular push buttons that are mounted within circular openings in housing sidewall 18 or may have other shapes. Button 24 may be a slide switch that has two or more positions. Button 24 may, for example, be a ringer button in a cellular telephone that is used to place the cellular telephone in either a regular mode in which its ringer is audible or in a silent mode in which a vibrator is used in place of the ringer (i.e., a mode in which the ringer has been muted).

A user of device 10 may control the position of button 24 by moving a movable member such as movable button member 26 within opening 28 in sidewall 18. The user may, for example, slide button member 26 back and forth within opening 28 to place device 10 in a regular or silent mode of operation or to control other device functions.

Figure 2:
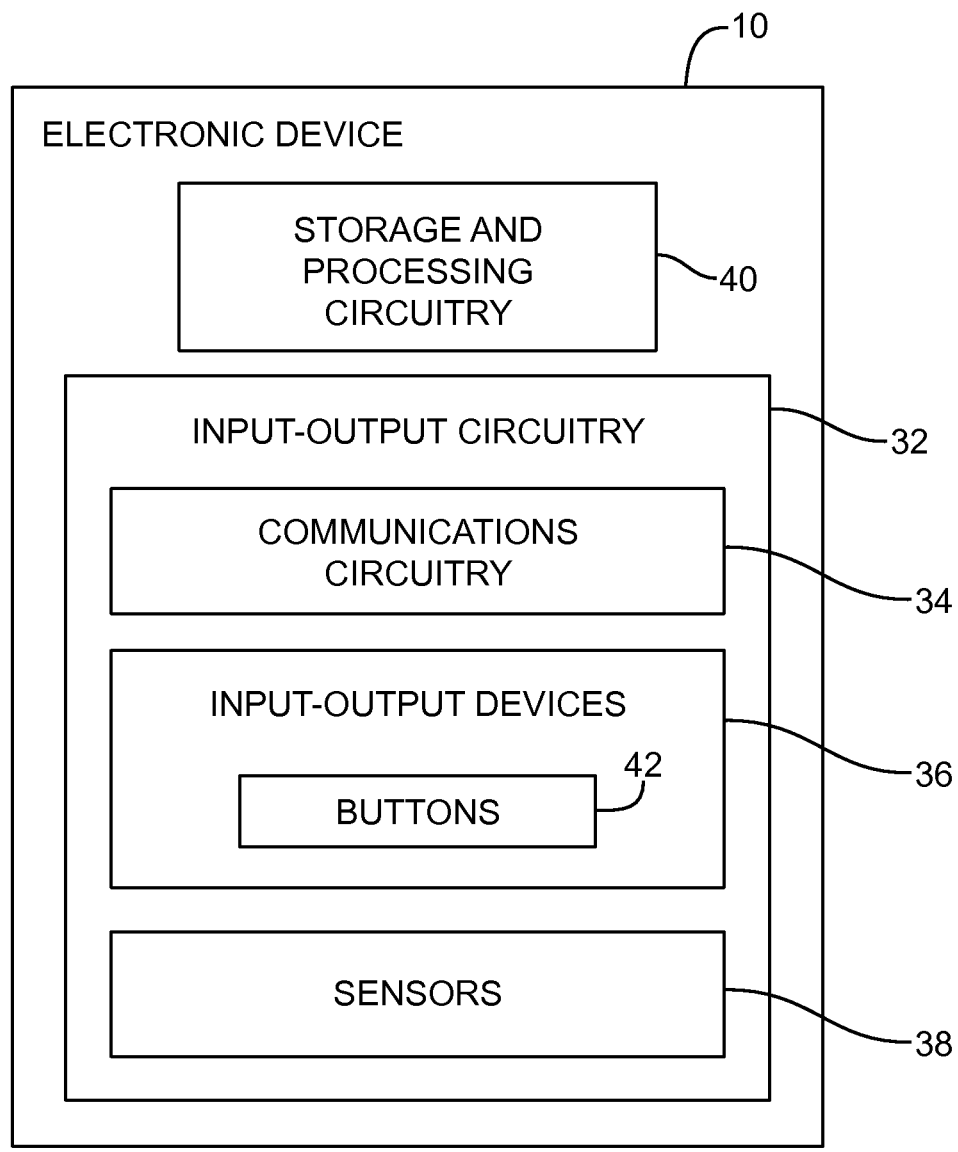
FIG. 2 is a schematic view of an illustrative electronic device of the type that may be provided with switches mounted in accordance with an embodiment.

A schematic diagram of device 10 is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on a processor such as a microprocessor and other suitable integrated circuits. With one suitable arrangement, storage and processing circuitry 40 may be used to run software on device 10 such as internet browsing applications, email applications, media playback applications, operating system functions, software for capturing and processing images, software implementing functions associated with gathering and processing sensor data, software that makes adjustments to display brightness and touch sensor functionality, etc.

Input-output circuitry 32 may be used to allow input to be supplied to device 10 from a user or external devices and to allow output to be provided from device 10 to the user or external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as buttons 42 (e.g., button 16 of FIG. 1, buttons 22 of FIG. 1, button 24 of FIG. 1, etc.). Input-output circuitry 32 may also include joysticks, click wheels, scrolling wheels, a touch screen such as display 14 of FIG. 1, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user.

Sensor circuitry such as sensors 38 of FIG. 2 may include an ambient light sensor for gathering information on ambient light levels, proximity sensor components (e.g., light-based proximity sensors and/or proximity sensors based on other structures), accelerometers, gyroscopes, magnetic sensors, and other sensor structures.

Figure 3:
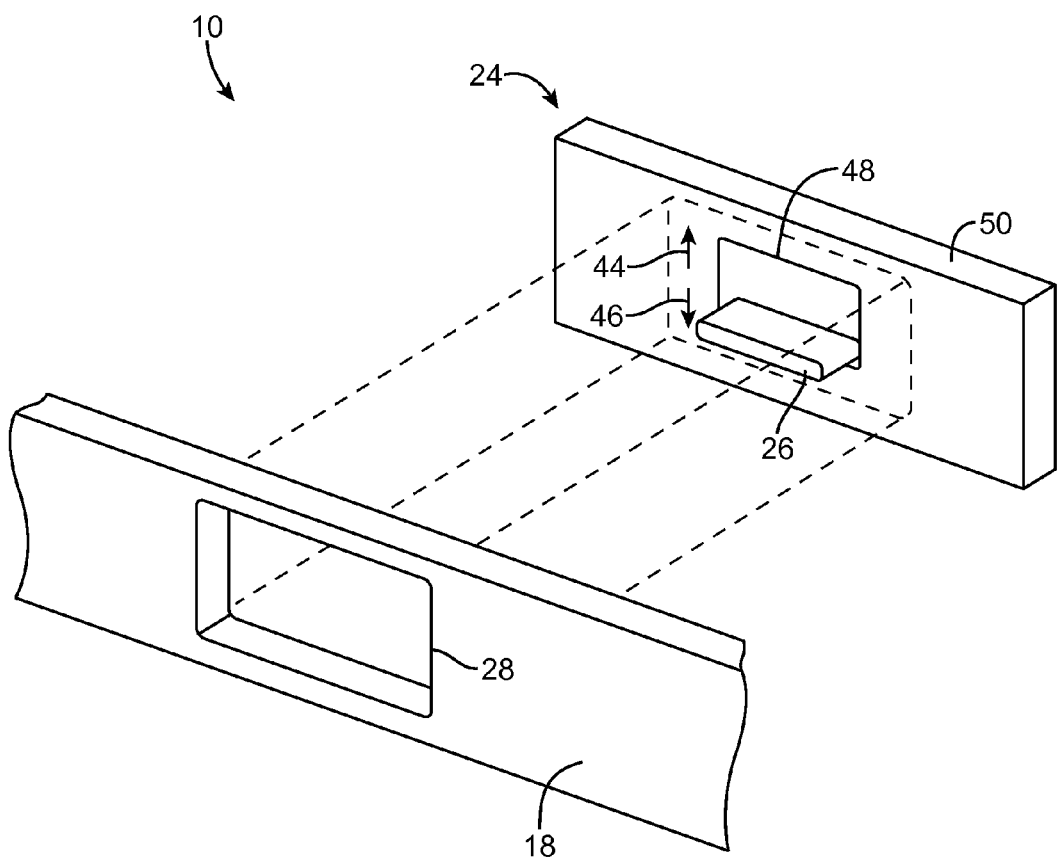
FIG. 3 is a perspective view of an illustrative button and a portion of an electronic device housing structure having an opening in which the switch may be mounted in accordance with an embodiment.

An exploded perspective view of button 24 of FIG. 1 is shown in FIG. 3. As shown in FIG. 3, housing wall 18 may be provided with an opening such as rectangular opening 28 through which button member 26 may protrude when button 24 is mounted within device 10. Button 24 is formed from a switch such as switch 50. Switch 50 can be placed in a desired state (e.g., open or closed in a two-position switch configuration) by sliding button member 26 in upwards direction 44 or downwards direction 46. This causes button member 26 to move within switch housing opening 48. Switch 50 of button 24 may be a slide switch (as shown in FIG. 3) or any other suitable type of switch (e.g., a push button switch, a momentary switch, a three-position switch, an infinitely variable sliding switch, a rotary switch, etc.). Configurations for button 24 in which switch 50 is a two-position slide switch are sometimes described herein as an example. This is, however, merely illustrative. Button 24 may be based on any suitable type of switch structures.

Figure 4:
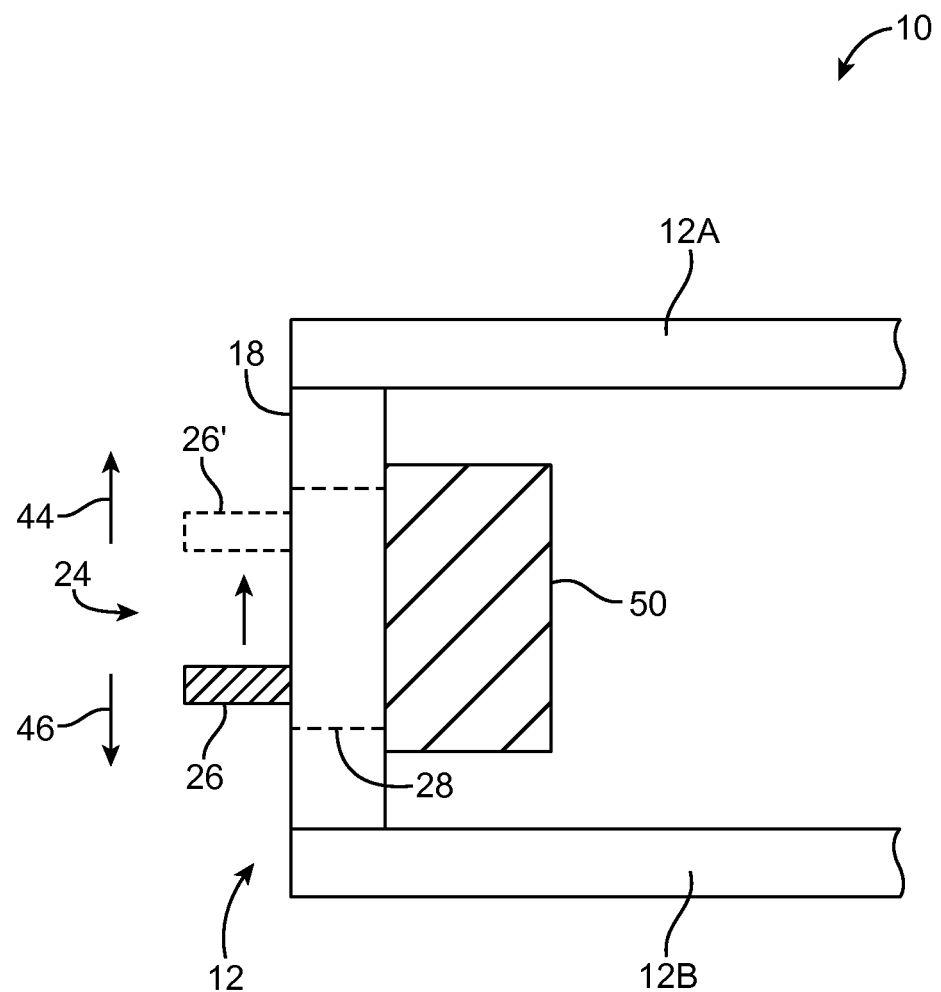
FIG. 4 is a cross-sectional side view of a switch structure that has been mounted in an electronic device housing in accordance with an embodiment.

A cross-sectional view of button 24 taken along line 30 of FIG. 1 and viewed in direction 31 is shown in FIG. 4. In the illustrative configuration of FIG. 4, electronic device 10 has a vertical electronic device housing sidewall 18 with an opening such as opening 28 to accommodate sliding button member 26 of button 24. During operation of device 10, a user of device 10 may slid button member 26 within opening 28. For example, button member 26 may be slid downward in direction 46 until coming to rest in the position shown in FIG. 4 or may be slid upward in direction 44 until coming to rest in position 26'. Switches with button members that can be placed in additional positions (e.g., one or more intermediate positions between the position shown by member 26 and position 26' of FIG. 4) may be incorporated into device 10 if desired. The arrangement of FIG. 4 is merely illustrative.

Housing 12 may have structures such as rear housing structure 12B and front housing structure 12A. Front housing structure 12A may, as an example, form part of a display cover layer such as a sheet of glass or plastic. Front and rear housing structures 12A and 12B may form housing walls that are separate from or integral portions of sidewall 18. Front and rear housing structures 12A and 12B may be formed from layers of plastic, layers of glass, layers of metal, glass mounted on metal, fiber-based composite material, other suitable materials, or combinations of these materials.

With one suitable arrangement, housing wall 18 may be formed from a peripheral housing structure such as a metal band or metal sidewall structure and rear housing wall 12B may be formed from an integral metal structure or from a separate structure formed from glass, plastic, metal, or other material. Housing sidewall 18 has a vertical exterior surface. If desired, the outer surface of the housing sidewalls in device 10 may be provided with curved shapes.

Figure 5:
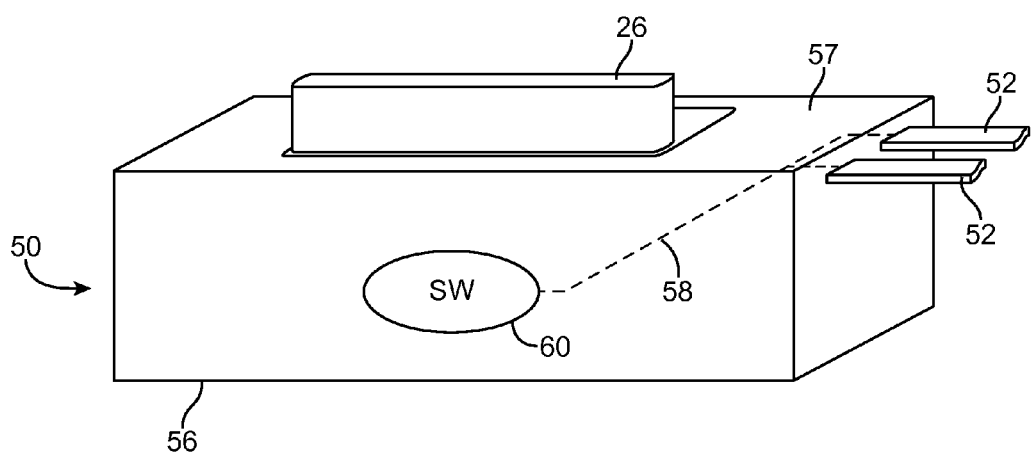
FIG. 5 is a perspective of a switch having leads for use in mounting the switch in an electronic device in accordance with an embodiment.

Switch 50 may have two or more terminals. For example, switch 50 may have a pair of metal terminals. The terminals of switch 50 may be formed from extending (elongated) metal structures (sometimes referred to as leads), such as leads 52 of FIG. 5. Leads 52 may be formed from copper, aluminum, gold-plated copper, or other metals. As shown in FIG. 5, switch 50 may have a rectangular housing formed from plastic or other dielectric material such as switch housing (body) 56. Leads 52 may, if desired, extend from housing 56 at surface 57 (e.g., through housing surface 57 or through the side of housing 56 near surface 57).

A switch mechanism such as switch mechanism 60 may be mounted within switch housing 56. Switch mechanism 60 may be based on structures such as dome switch structures, spring-based switch structures, microelectromechanical systems switch structures, transistors and other solid state devices, or other switching circuitry.

Switch mechanism 60 may be coupled to the terminals of switch 50 (e.g., leads 52) using signal path 58. Signal path 58 may include two or more wires or other conductive lines. For example, in a configuration in which switch mechanism 60 includes a pair of terminals and in which there are two corresponding terminals on the exterior of switch body 56 such as leads 52, two respective conductive lines may be included in signal path 58. Each of the lines in path 58 may couple a respective internal switch mechanism terminal to a respective switch lead.

Leads 52 of switch 50 may be sufficiently elongated to allow the leads to be mounted on top of a support structure that is placed adjacent to switch 50. Switch 50 may also be constructed using a configuration for switch body 56 that allows the leads to be contacted from the inner (interior-facing) surface of switch body 56. In a conventional cellular telephone switch, switch terminals face outwards and contact with the switch terminals is made by interposing a flexible printed circuit with signal traces between the outwardly-facing switch terminals and the inner surface of the cellular telephone housing wall, adding undesired bulk and forcing the flexible printed circuit to bend in the vicinity of the switch.

By providing switch 50 of FIG. 5 with suitably configured terminals, improved connections may be made to switch 50 when installing switch 50 within device 10 to form button 24. Flexible printed circuit lines or other such lines may, for example, be coupled to switch leads such as leads 52 at a location that is located to the side or rear of switch 50, thereby conserving space and simplifying switch mounting.

Figure 6:
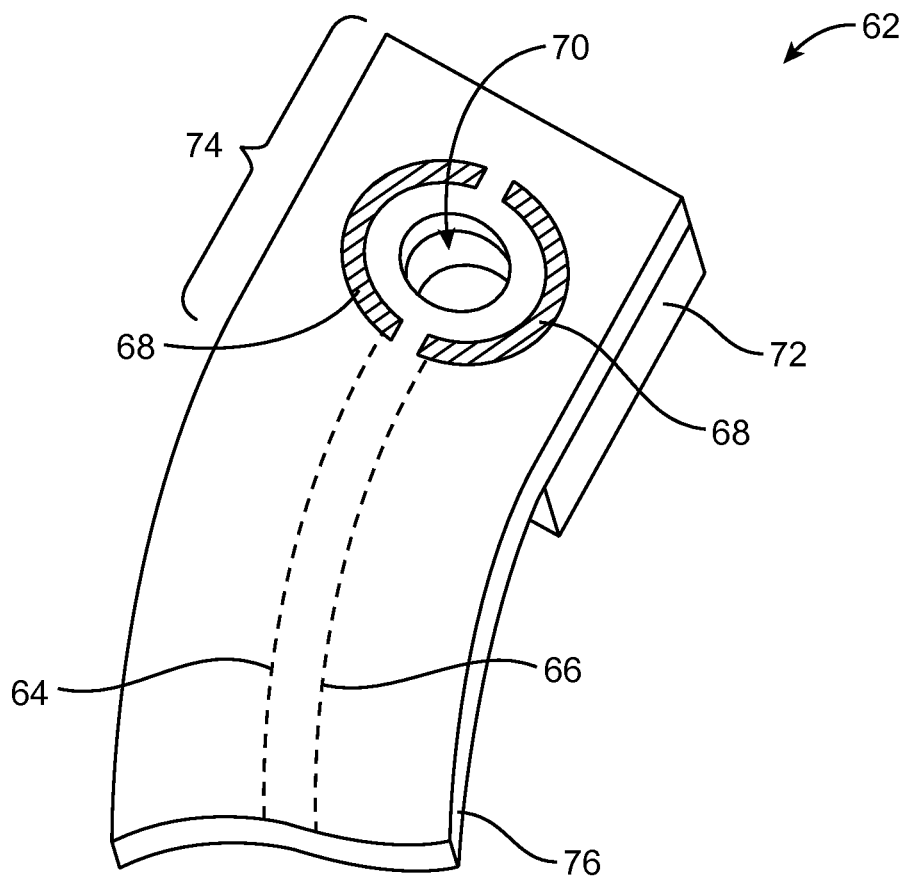
FIG. 6 is a perspective view of a flexible printed circuit having traces that are configured to mate with traces on a switch in an electronic device in accordance with an embodiment.

Signal path structures of the type that may be used to couple switch 50 to control circuitry 40 in device 10 are shown in FIG. 6. As shown in FIG. 6, signal path structures 62 may include a substrate such as substrate 76 on which signal lines such as metal traces 64 and 66 may be formed. Substrate 76 may be a plastic carrier, glass, ceramic, or other dielectric materials. For example, substrate 76 may be a printed circuit substrate such as a rigid printed circuit board (e.g., a fiberglass-filled epoxy board) or a flexible printed circuit (e.g., a layer of polyimide or other sheet of flexible polymer). Illustrative configurations for signal path structures 62 in which substrate 76 is a flexible printed circuit are sometimes described herein as an example.

Metal traces 64 and 66 may be embedded within flexible printed circuit 76 (e.g., in configurations in which flexible printed circuit 76 is a multilayer printed circuit) or may be formed on one or more exposed surfaces on printed circuit 76.

Terminal portions 68 of metal traces 64 and 66 may form terminals (contacts) for flexible printed circuit 76. These terminals may be configured to mate with terminals 52 of switch 50. In the illustrative configuration of FIG. 6, end portion 74 of flexible printed circuit 76 has been provided with stiffening structures such as stiffener 72. Stiffener 72 may be formed from a square sheet of plastic or sheet metal (e.g., stainless steel) or other stiffening member. Opening 70 may be formed through flexible printed circuit 76 and stiffening member 72 (i.e., flexible printed circuit 76 may have an opening that is aligned with an opening in stiffening member 72). Stiffening member 72 may be attached to flexible printed circuit 76 using adhesive (as an example).

Terminals 68 of metal traces 64 and 66 may each have the shape of a curved strip of metal that runs around at least part of opening 70. Opening 70 may have a diameter that is configured to accommodate a screw shaft. Terminals 68 may form a segmented circular ring of metal traces having a diameter that is larger than the diameter of screw hole 70, but that is less than the diameter of the head of the screw. With this arrangement, the inner surface of the head of the screw will provide a concentrated force on terminals 68 that helps press terminals 68 in place against terminals 52 when the screw is inserted through opening 70 and is used to attach flexible printed circuit 76 within device 10. Other terminal shapes may be used for flexible printed circuit terminals 68 if desired. The use of a segmented circular terminal shape that matches the size of the head of a flexible printed circuit mounting screw is merely illustrative.

Figure 7:
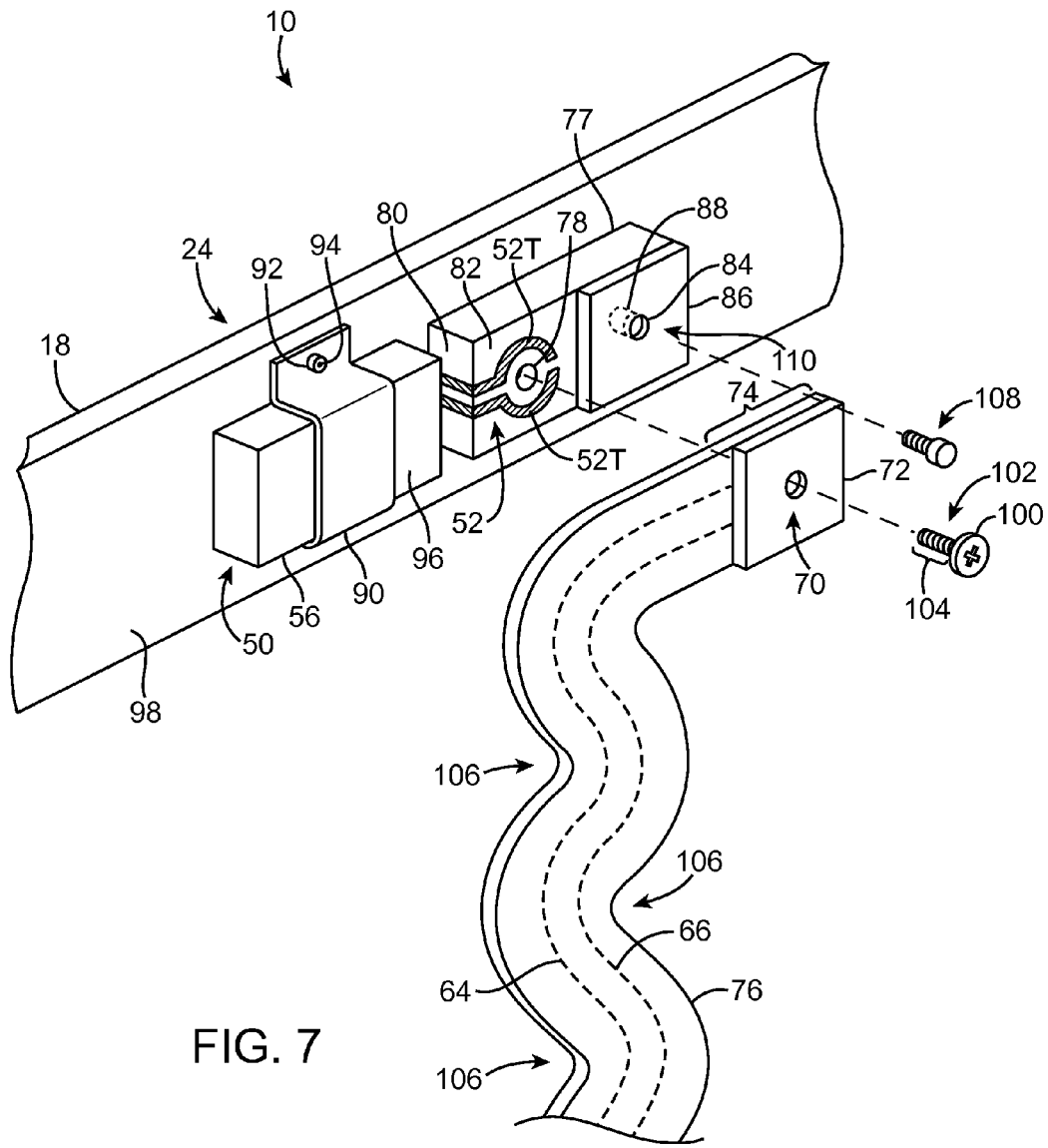
FIG. 7 is an exploded perspective view of a switch having leads supported by support structures on an electronic device housing wall and a flexible printed circuit that mates with the leads in accordance with an embodiment.

If desired, device 10 may be provided with support structures for leads 52. The support structures may, for example, be implemented using a molded plastic member or other dielectric structures such as support structures 77 of FIG. 7. As shown in FIG. 7, switch 50 may be mounted so that its outermost surface (surface 57 of FIG. 5) is adjacent to inner surface 98 of housing sidewall 18 (or other portion of housing 12). As an example, one or more mounting structures such as bracket 90 may be used to press against opposing inner surface 96 of switch housing 56 so that the outer surface of switch housing 56 presses against surface 98 of housing sidewall 18.

Switch mounting bracket 90 may have screw holes such as opening 92 to accommodate mounting screws such as screw 94. Mounting screws 94 may have threaded shafts that pass through openings such as opening 92 and that screw into corresponding threaded openings in housing sidewall 18. If desired, welds, adhesive, solder, mating engagement features, or other mounting structures may be used in attaching switch mounting structures such as bracket 90 to housing sidewall 18. The illustrative configuration of FIG. 7 in which switch 50 is attached to housing wall 18 in housing 12 using bracket 90 over switch housing 56 is merely illustrative.

Support structures 77 may be attached to housing sidewall 18 in a position that is adjacent to switch 50. The outer surface of support structures 77 rests against housing sidewall 18 and opposing inner surface 82 of support structures 77 serves as a support for switch leads 52. Support structures 77 may be formed from a material such as plastic, from metal coated with plastic, from glass, ceramic, other materials, or combinations of these materials.

Support structures 77 may be attached to housing sidewall 18 using adhesive, welds, solder, engagement features, fasteners, or using other suitable mounting structures. As shown in FIG. 7, for example, fasteners such as screw 108 may be used in attaching support structures 77 to housing sidewall 18.

Screw 108 may have a threaded shaft that passes through support structures 77 via opening 110 and that threads into a mating threaded opening in housing sidewall 18. Strengthening members such as metal sheet 86 (e.g., a metal washer) or other stiffening structures may be used to help strengthen support structures 77 in the vicinity of opening 110 to help prevent damage to support structures 77 when support structures 77 are being attached to housing wall 18 using screw 108. Screw hole opening 110 for screw 108 may be formed from opening 84 in stiffening member 86 and aligned opening 88 in support structures 77.

Leads 52 of switch 50 may exit switch housing 56 at surface 57 of switch housing 56 near inner surface 98 of housing sidewall 18. Leads 52 may then run along vertical wall 80 of support structures 77. The tips of leads 52 such as terminal portions 52T may lie on inner surface 82 of support structures 77. As shown in FIG. 7, terminal portions 52T of leads 52 may have a segmented circular shape. Terminal portions 52T may, for example, form first and second semicircular terminals that are supported by inner surface 82 of support structures 77 and that are configured to mate with corresponding first and second semicircular terminals 68 at the end of signal lines 64 and 66 on the outermost surface of flexible printed circuit 76 (see, e.g., FIG. 6).

To form an electrical connection between switch 50 and other circuitry in device 10 such as control circuitry 40 (FIG. 2), screw 102 may be used to screw portion 74 of flexible printed circuit 76 into place against leads 52. Shaft 104 of screw 102 has threads that screw into corresponding threads in a threaded opening in housing wall 18. Support structures 77 have an opening such as opening 78 that is aligned with opening 70 of flexible printed circuit 76. When openings 70 and 78 are aligned with each other and when flexible printed circuit 76 has been placed against leads 52 so that leads 52 are sandwiched between end portion 74 of flexible printed circuit 76 and support structures 77, screw 102 may be screwed into place on housing sidewall 18. This causes head 100 of screw 102 to bear against stiffening member 72 and flexible printed circuit 76. When flexible printed circuit 76 is mounted to support structures 77 and housing sidewall 18 in this way, each of terminals 68 of the metal traces on flexible printed circuit 76 will mate with a corresponding one of the terminals formed from portion 52T of leads 52. Head 100 will then compress terminals 68 against portions 52T of leads 52 to form low resistance connections and thereby electrically connect switch 50 to signal line paths 64 and 66 of flexible printed circuit 76.

As shown in FIG. 7, flexible printed circuit 76 may have an elongated shape with bent edges such as bends 106 so that traces 64 and 66 and the substrate of flexible printed circuit 76 follow a meandering path. Flexible printed circuit 76 may, if desired, be cut using a laser cutter or die press so that the outline of the flexible printed circuit has a serpentine shape. The meandering path shape of flexible printed circuit 76 may be used in forming a service loop that can accommodate movement of end portion 74 within device 10 without damaging flexible printed circuit 76 or detaching flexible printed circuit 76 from other circuitry within device 10. A service loop may also be formed by folding flexible printed circuit 76.

Figure 8:
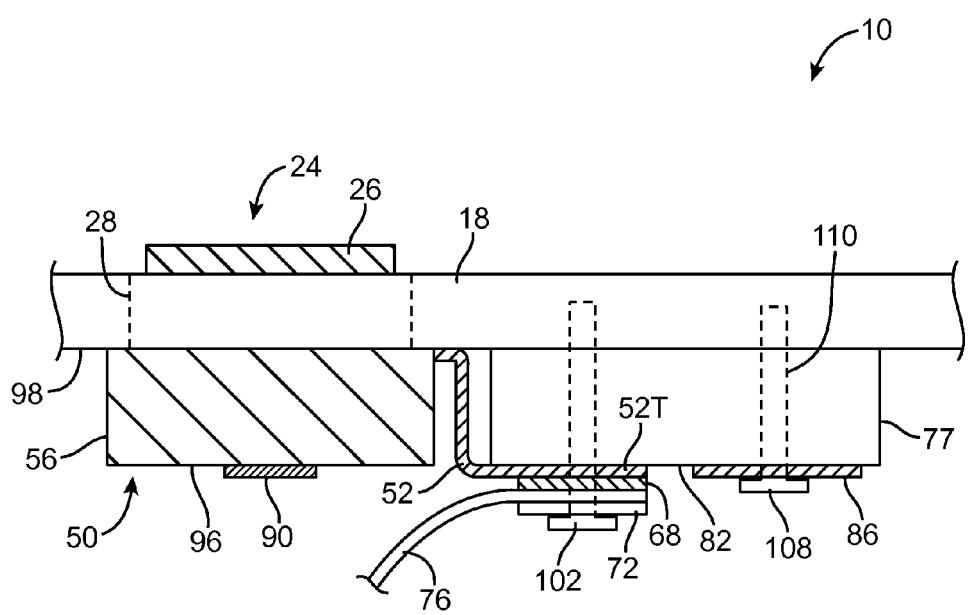
FIG. 8 is a top view of the switch and support structures of FIG. 7 following attachment of the traces in the flexible printed circuit to the leads of the switch by mounting the flexible printed circuit and support structures to a housing sidewall in an electronic device in accordance with an embodiment.

FIG. 8 is a top view of button 24 and support structures 77 of FIG. 7. As shown in FIG. 8, when switch 50 is mounted against inner surface 98 of housing wall 18 with bracket 90, button member 26 protrudes through opening 28 in housing wall 18 so that button 24 can be controlled by a user of device 10. Due to the pressure from screw 102, leads 68 on the outwardly facing surface of flexible printed circuit 76 are pressed against mating portions 52T of switch leads 52. Shorting leads 52 to contacts such as the segmented circular structures formed from metal traces 68 on flexible printed circuit 76 in this way serves to interconnect switch 50 of button 24 with control circuitry 40 in device 10. Because flexible printed circuit 76 is attached to leads 52 on upper surface 82 of support structures 77, it is not necessary to form a bend in flexible printed circuit 76 in the vicinity of switch 50 when connecting flexible printed circuit 76 to leads 52, thereby reducing stress on the metal traces in flexible printed circuit 76 such as traces 64 and 66.

Figure 9:
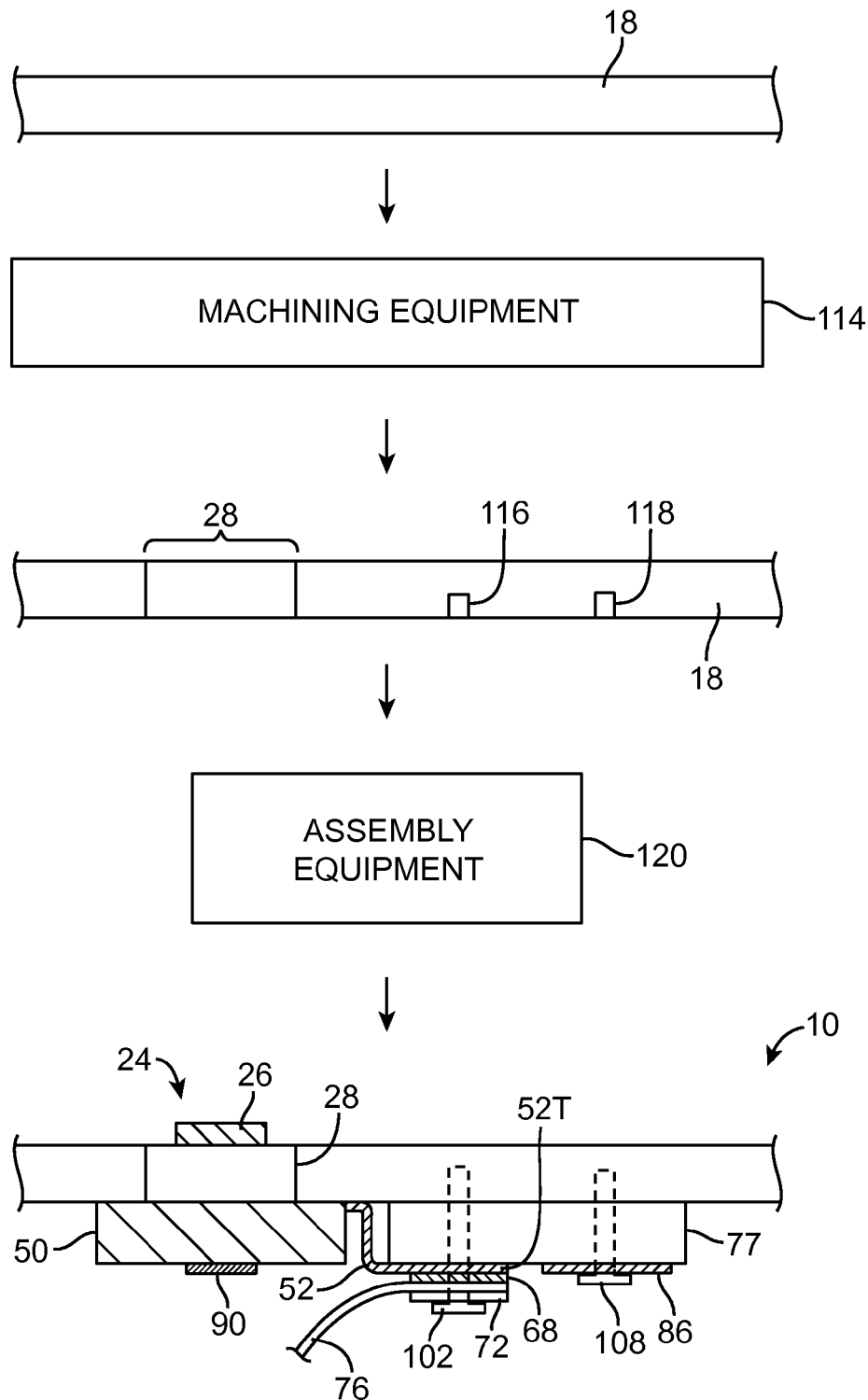
FIG. 9 is a diagram showing equipment and operations involved in mounting a button within an electronic device housing elongated switch leads and mounting structures in accordance with an embodiment.

FIG. 9 is a diagram of illustrative equipment and operations involved in mounting button 24 within device 10 using an approach of the type described in connection with FIGS. 5, 6, 7, and 8.

Initially, a housing may be constructed for device 10. Housing 12 (e.g., sidewall 18) may then be processed using processing equipment such as machining equipment 114 to form features such as opening 28 for button member 26, openings such as threaded screw hole openings 116 and 118 for screws 102 and 108, respectively, and bracket screw openings 92 (FIG. 7). Housing structure 18 and features such as opening 28, openings 116 and 118, and bracket screw openings 92 may be formed using processes such as molding, casting, stamping, laser cutting, water-jet cutting, machining with equipment 114 using a rotating cutting head such as a milling bit, drill bit, or other cutter, grinding, polishing, etc.

Assembly equipment 120 (e.g., computer-controlled positioners and other assembly equipment) may be used in installing switch 50 using screws 94 and bracket 90, may be used in attaching support structures 77 to housing wall 18 using screw 108, and may be used in attaching flexible printed circuit 76 to support structure 77 and housing 18 using screw 102 (i.e., so that metal traces 68 on flexible printed circuit 76 mate with portions 52T of switch leads 52).

Figure 10:
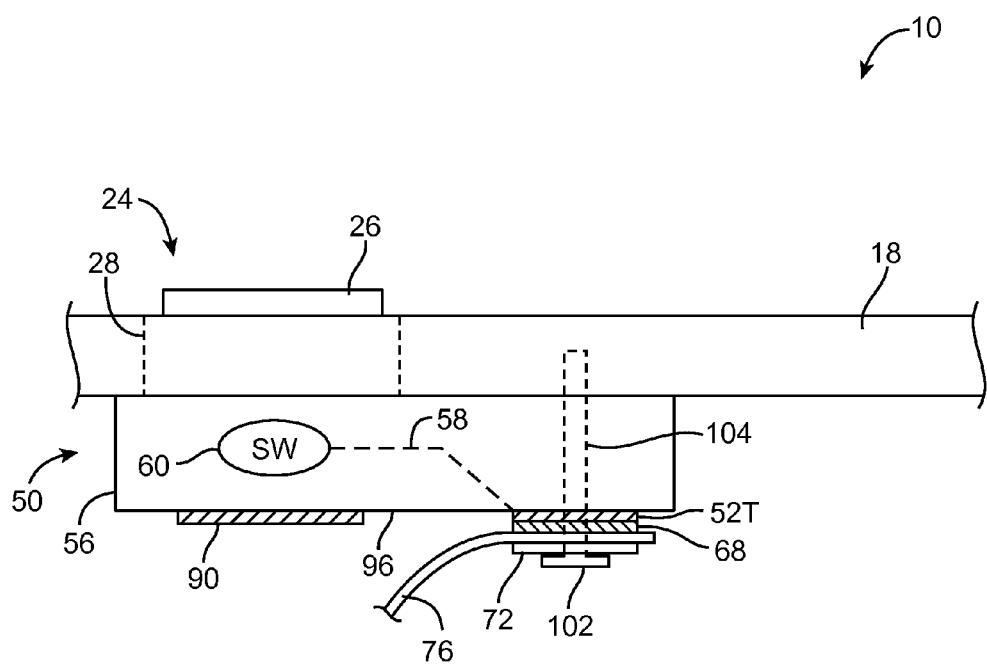
FIG. 10 is a top view of a button having a switch housing with an extended portion on which terminals are located that are configured to mate with corresponding terminals on a flexible printed circuit when the switch housing is mounted to an electronic device housing wall in accordance with an embodiment.

If desired, switch 50 may be provided with terminals (leads) that are formed directly on inner (rear) surface 96 of switch housing 56, as shown in FIG. 10. In this type of configuration, switch mechanism 60 may be coupled to terminals 52T on surface 96 using conductive lines in signal path 58 (e.g., a pair of lines in path 58 may be used to couple a pair of terminals in switch mechanism 60 to a respective pair of terminals 52T formed from metal on inner surface 96 of switch housing 56). A screw hole may be formed in switch housing 56 and an aligned screw hole may be formed in housing sidewall 18 to receive shaft 104 of screw 102. The opening in housing 18 may have threads that receive mating threads on shaft 104, thereby allowing screw 102 to be screwed into housing wall 18 to hold flexible printed circuit terminals 68 and flexible printed circuit 76 against switch terminals 52T. Screw 102 may also mount switch housing 56 to housing wall 18. Switches such as switch 50 of FIG. 10 may be assembled with the structures of device 10 using equipment such as assembly equipment 120 of FIG. 9.

Figure 11:
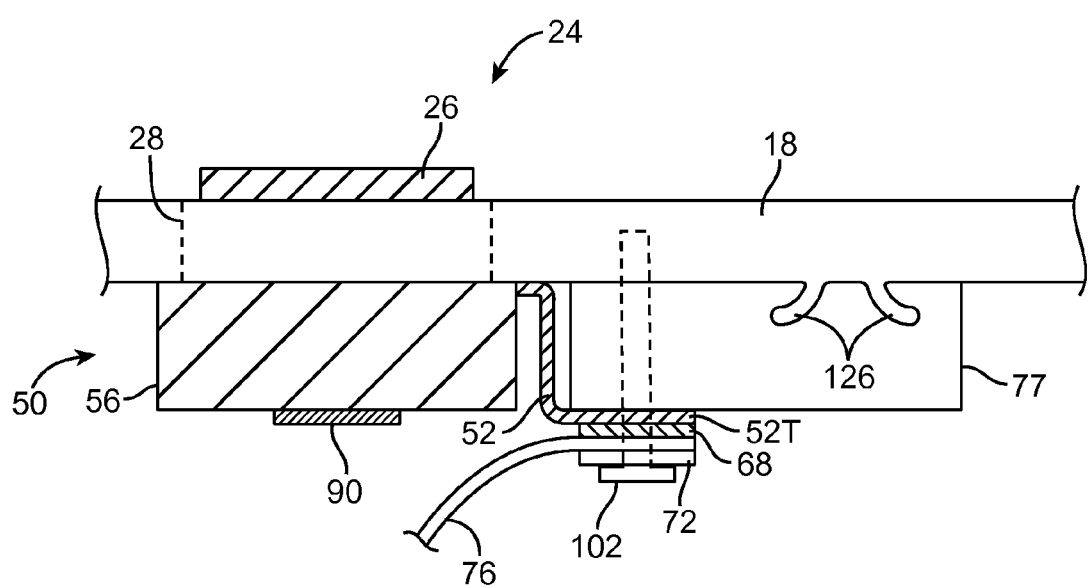
FIG. 11 is a top view of a switch with extended leads supported by support structures that are overmolded on top of electronic device housing engagement features such as a housing wall protrusions in an electronic device in accordance with an embodiment.

As shown in the illustrative configuration of FIG. 11, housing wall 18 may be provided with engagement features such as housing recesses or protrusions. As an example, housing wall 18 may be provided with engagement structures such as protruding structures 126. Structures 126 may be formed from plastic, metal, or other materials. As an example, housing wall 18 may be formed from metal and protruding structures 126 may be protrusions that are formed as integral portions of housing wall 18 or may be metal structures that are welded or otherwise attached to housing wall 18. Support structures 77 may be formed from plastic or other material that engages protruding structures 126. For example, structures 77 may be formed from plastic that is overmolded on top of protruding structures 126.

Figure 12:
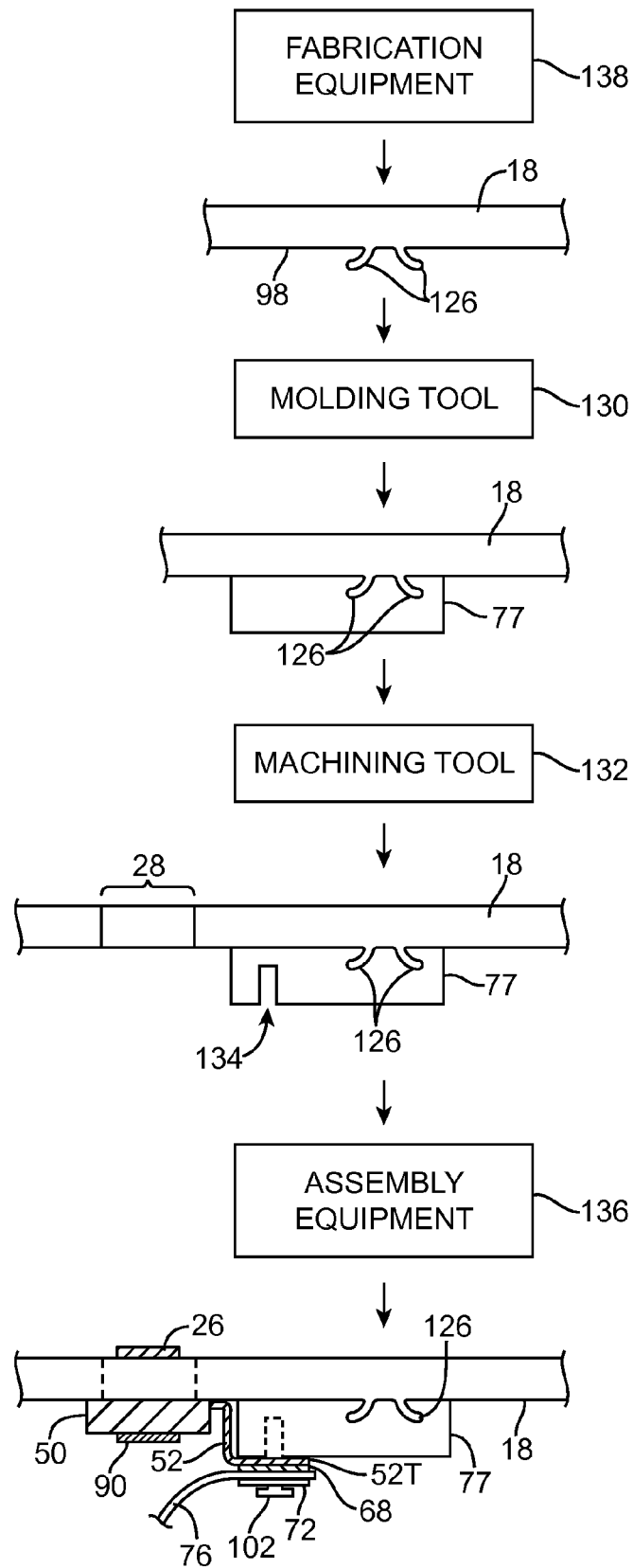
FIG. 12 a diagram showing equipment and operations involved in mounting a switch within an electronic device housing overmolded plastic switch lead support structures attached to engagement features on an interior surface of an electronic device housing wall in accordance with an embodiment.

FIG. 12 is a diagram of illustrative equipment and operations involved in mounting button 24 within device 10 using an approach of the type described in connection with FIG. 11.

As shown in FIG. 12, a housing may be constructed for device 10 with protruding portions 126 using fabrication equipment 138. Fabrication equipment 138 may include molding equipment for forming housing structures 18 from molded plastic, machining equipment for forming housing structures 18 from metal, or other suitable equipment. During formation of housing wall structures 18, protruding structures 126 on inner surface 98 of housing wall structures 18 may be formed using fabrication equipment 138 (e.g., by molding structures 126 as an integral portion of housing wall structures 18, by welding metal structures or other structures 126 to inner surface 98, by machining a metal structure to form integral protrusions 126 on housing wall 18, or by otherwise fabricating housing wall 18 with protruding structures 126). If desired, housing 18 may be provided with recesses that serve as engagement features for support structures 77. The use of protruding shapes for forming engagement features 126 of FIG. 12 is merely illustrative.

Following formation of protruding structures 126 (or recess-shaped engagement structures), molding equipment 130 may be used to overmold plastic onto protruding structures 126 to form support structures 77.

Machining tool 132 may use a rotating cutting head or other equipment to form openings 28 and openings such as opening 134 in support structures 77. Screw holes for bracket mounting screws and other features may also be machined using equipment 132.

Computer-controlled positioners and other equipment in assembly equipment 136 may then attach the structures of FIG. 12 to housing wall 18. For example, switch 50 may be attached to housing wall 18 using bracket 90 and leads 52 may be interposed between the innermost surface of support structures 77 and terminals 68 on flexible printed circuit 76.

The foregoing is merely illustrative and various modifications can be made by those skilled in the art without departing from the scope and spirit of the described embodiments. The foregoing embodiments may be implemented individually or in any combination.

What is claimed is:

1. Apparatus, comprising:
   an electronic device housing that has a sidewall with an opening;
   a switch mounted in the electronic device housing, wherein the switch has switch leads, a switch housing, and a movable button member in the switch housing that protrudes through the opening;
   support structures for the leads that are attached to the electronic device housing; and
   a flexible printed circuit having terminals coupled to the leads, wherein the switch housing has an outer surface adjacent to the sidewall and an opposing inner surface, and wherein the switch leads protrude from the switch housing adjacent to the sidewall.

2. The apparatus defined in claim 1 further comprising a screw that presses the terminals of the flexible printed circuit against the leads.

3. The apparatus defined in claim 2 wherein the support structures comprise plastic.

4. The apparatus defined in claim 3 wherein the sidewall comprises metal.

5. The apparatus defined in claim 4 wherein the terminals comprise a segmented ring of metal traces.

6. The apparatus defined in claim 5 further comprising a stiffening member, wherein the stiffening member and the support structures have aligned openings and wherein the screw has a shaft that passes through the aligned openings.

7. The apparatus defined in claim 6 wherein the flexible printed circuit has traces coupled to the terminals and has bent edges that form a meandering path for the traces.

8. The apparatus defined in claim 7 further comprising an additional screw that attaches the support structures to the metal housing sidewall.

9. The apparatus defined in claim 8 further comprising a planar member with an opening, wherein the support structures have an opening aligned with the opening in the planar member and wherein the additional screw passes through the opening in the planar member and the aligned opening in the support structures.

10. The apparatus defined in claim 9 further comprising a bracket that attaches the switch to the sidewall.

11. The apparatus defined in claim 1 wherein the support structures have an outer surface adjacent to the sidewall and an opposing inner surface on which a portion of the switch leads are located.

12. The apparatus defined in claim 11 further comprising a screw that presses the terminals of the flexible printed circuit against the portion of the switch leads located on the inner surface of the support structures.

13. The apparatus defined in claim 1 wherein the electronic device housing comprises engagement features and wherein the support structures comprises plastic support structures that engage the engagement features.

14. The apparatus defined in claim 1 wherein the electronic device housing comprises protruding structures and wherein the support structures comprise overmolded plastic support structures that engage the protruding structures.

15. The apparatus defined in claim 14 wherein the sidewall comprises metal and wherein the protruding structures comprise integral portions of the metal sidewall.

16. Apparatus, comprising:
an electronic device housing that has a sidewall with an opening;
a switch mounted in the electronic device housing, wherein the switch has a switch housing with an outer surface adjacent to the electronic device housing and an opposing inner surface, switch terminals on the inner surface, and a movable button member in the switch housing that protrudes through the opening, wherein the outer surface of the switch housing presses against the sidewall;
a flexible printed circuit having flexible printed circuit terminals coupled to the switch terminals, wherein the switch has an opening; and
a screw that passes through the opening of the switch and screws into the sidewall.

17. The apparatus defined in claim 16 further comprising a bracket that holds the switch body to the sidewall.

18. The apparatus defined in claim 17 wherein the flexible printed circuit has an opening and wherein the screw passes through the opening in the flexible printed circuit.

19. A method for mounting a switch within an electronic device having an electronic device housing sidewall, comprising:
placing a switch adjacent to an opening in the electronic device housing sidewall so that a movable button member in the switch protrudes through the opening, wherein the switch overlaps a first portion of the electronic device housing sidewall;
mounting support structures to the electronic device housing sidewall, wherein the support structures overlap a second portion of the electronic device housing sidewall that is different than the first portion, and wherein the support structures support switch leads that extend from the switch; and
coupling terminals on a flexible printed circuit to the switch leads by pressing the flexible printed circuit against the support structures.

20. The method defined in claim 19 wherein the electronic device housing sidewall has protrusions, wherein the support structures comprise plastic support structures, and wherein mounting the support structures comprises overmolding the plastic support structures onto the protrusions.

21. The method defined in claim 19 wherein the support structures have an opening and wherein mounting the support structures comprises screwing the support structures to the electronic device housing sidewall with a screw that passes through the opening.

22. The method defined in claim 21 further comprising passing the screw through an opening in the flexible printed circuit, wherein coupling the terminals on the flexible printed circuit to the switch leads comprises pressing the terminals of the flexible printed circuit against the switch leads using the screw.

23. The method defined in claim 19, wherein placing the switch adjacent to the opening in the electronic device housing sidewall comprises placing the switch in direct contact with the electronic device housing sidewall, and wherein mounting support structures to the electronic device housing sidewall comprises mounting support structures in direct contact with the electronic device housing sidewall.

24. The method defined in claim 19, wherein the first and second portions are non-overlapping.

* * * * *